June 24, 1958     G. J. YOUNG ET AL     2,840,522
REACTOR AND NOVEL METHOD

Filed Sept. 18, 1945     6 Sheets-Sheet 1

Inventors:
Gale J. Young
Leo A. Ohlinger

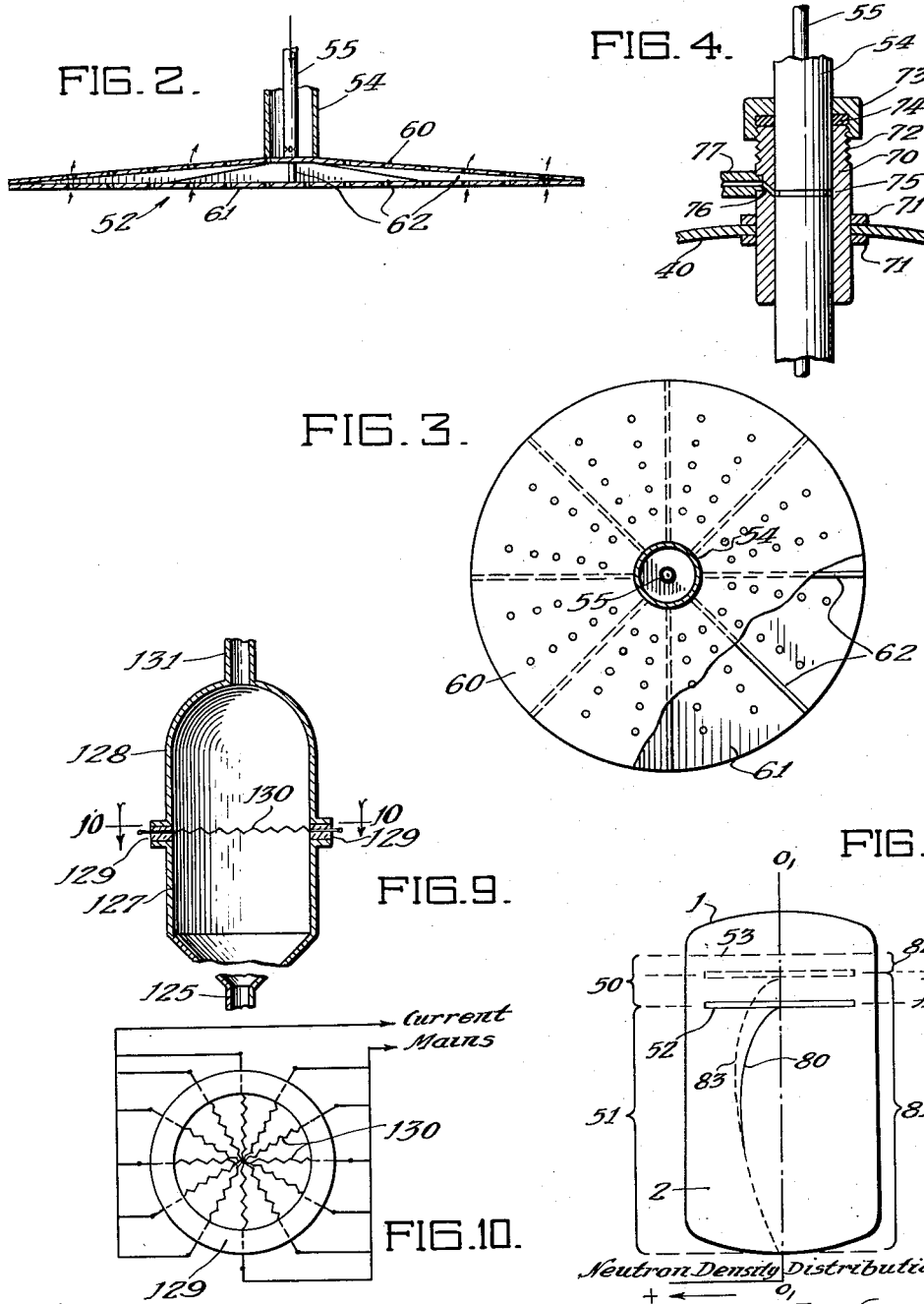

June 24, 1958 G. J. YOUNG ET AL 2,840,522
REACTOR AND NOVEL METHOD
Filed Sept. 18, 1945 6 Sheets-Sheet 3

June 24, 1958  G. J. YOUNG ET AL  2,840,522
REACTOR AND NOVEL METHOD
Filed Sept. 18, 1945  6 Sheets-Sheet 4

Inventors:
Gale J. Young
Leo A. Ohlinger

June 24, 1958 G. J. YOUNG ET AL 2,840,522
REACTOR AND NOVEL METHOD
Filed Sept. 18, 1945 6 Sheets-Sheet 5

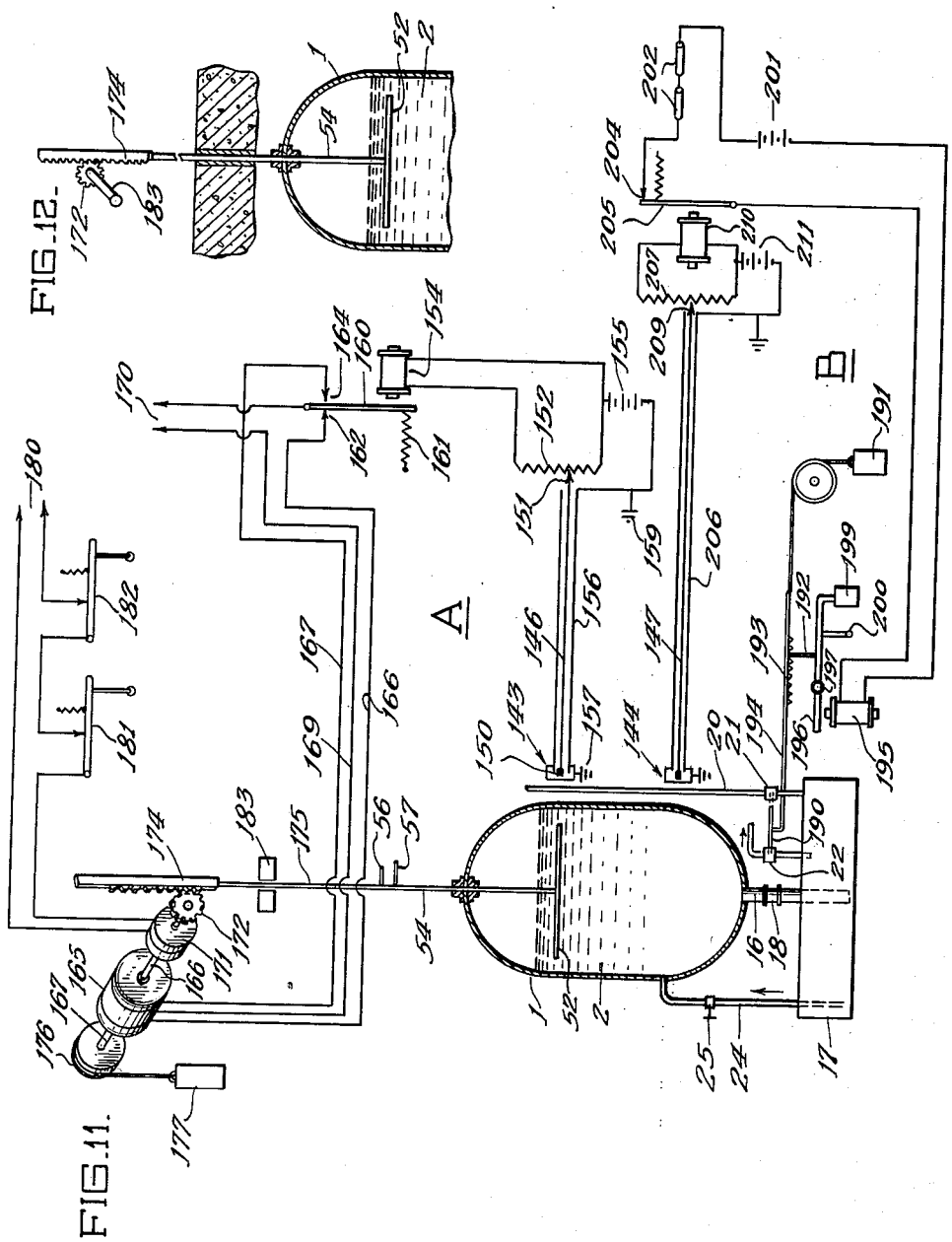

United States Patent Office 2,840,522
Patented June 24, 1958

2,840,522

REACTOR AND NOVEL METHOD

Gale J. Young and Leo A. Ohlinger, Chicago, Ill., assignors to the United States of America as represented by the United States Atomic Energy Commission Application September 18, 1945, Serial No. 617,122

9 Claims. (Cl. 204—154.2)

This invention relates to the control of neutronic reactors and to novel method and apparatus for effecting such control reactors. In neutronic reactors a neutron fissionable isotope such as $U^{233}$, $U^{235}$, or $94^{239}$ or mixtures thereof is subjected to fission by absorption of neutrons and a self-sustaining chain reaction is established by the neutrons evolved by the fission. In general such reactors comprise bodies of compositions containing such fissionable material, for example, natural uranium, disposed in a neutron slowing material which slow the neutrons to thermal energies. Such a slowing material is termed a neutron moderator. Carbon, beryllium and $D_2O$ are typical moderators suitable for such use and where pure fissionable material is used or a concentrate thereof ordinary water is a suitable moderator. Heat is evolved during the reaction which is removed by passage of a coolant through the reactor or in heat exchange relationship therewith. Specific details of the theory and essential characteristics of such reactors are set forth in copending application of Enrico Fermi and Leo Szilard, Serial No. 568,904, filed December 19, 1944, now Patent Number 2,708,656.

As pointed out in the aforesaid application, careful control of the rate of reaction generally is desirable and in most cases it is preferred to conduct such control so that the ratio of neutrons produced to neutrons consumed does not substantially exceed 1.01.

In accordance with the present invention, a new and effective method and means of control of such a reactor has been provided. This control is secured by dividing the reactor into sections whereby transfer of neutrons from one to the other does not occur to an appreciable degree.

These sections all may be below the critical size at which a neutron chain reaction will be maintained or may be divided into sections in which one is above critical size and another below critical size.

The invention is particularly applicable to neutronic reactors in which the moderator is in liquid state. Reactors of this type usually comprise a reactor tank which is partially filled with moderator and having the fissionable composition suspended in the moderator either as independently supported aggregates or bodies or as a slurry, solution or other suspension or dispersion. In such a case variation in the level of the moderator, such as that caused by ripples, swirls or local currents generated, for example, in circulation or agitation of the reactor, may effect a substantial change in the rate of neutron generation.

This may be due to the fact that the shape of the reactor and therefore its neutron leakage is changed and/or to the fact that the actual effective size of the reactor is increased. In accordance with the present invention this problem has been solved by providing a neutron absorber capable of substantially isolating the surface portion of the reactor from the zone in the reactor in which the neutron chain reaction is self-sustaining. In such a case the reactor is essentially divided into an active portion in which a self-sustaining chain reaction is established and maintained and a surface portion which is below critical size where such a self-sustaining reaction does not take place. Thus a neutron-absorbing plate or other form of neutron absorber may be placed under the moderator surface to extend laterally across the reactor and thereby to substantially eliminate effects caused by change in shape or size of the moderator or reactor due to surface ripples or swirls by dividing the surface portion of the reactor from the main portion in which the chain reaction is self-sustaining.

From the foregoing, it will be apparent that it is an object of our invention to control a neutronic reactor in a more effective manner than heretofore.

It is another object to provide a method and apparatus for controlling a neutronic reactor having a liquid moderator such as heavy water as a neutron slowing medium or moderator.

The above objects and other objects, features and advantages of our invention will become apparent when considered in view of the following description and the accompanying drawings, wherein:

Fig. 2 is an elevation view partly in vertical cross-section of a control plate assembly suitable for controlling a nuclear chain reaction;

Fig. 3 is a plan view, partially cut away, of the structure shown in Fig. 2;

Fig. 4 is an elevation view partly in vertical cross-section of a vapor and gaseous seal utilized in conjunction with one particular reactor made and operated in accordance with our invention;

Fig. 5 is a diagram of the reactor portion of a neutronic generator system with two curves superimposed thereon for explaining one particular aspect of our invention;

Fig. 9 is an enlarged elevation view in cross-section of a portion of the apparatus shown in Fig. 7;

Fig. 10 is a plan view in cross-section of the structure shown in Fig. 9 taken along the line 9—9 thereof, with an electrical circuit for operation of the structure;

Fig. 11 is an elevation view partly in cross-section showing a neutronic reactor and slurry reservoir with a circuit for controlling a nuclear chain reacting system in accordance with our invention; and Fig. 12 is an elevation view of a portion of a neutronic reactor in cross-section illustrating one method of controlling a nuclear chain reacting system in accordance with our invention.

Figure 1:
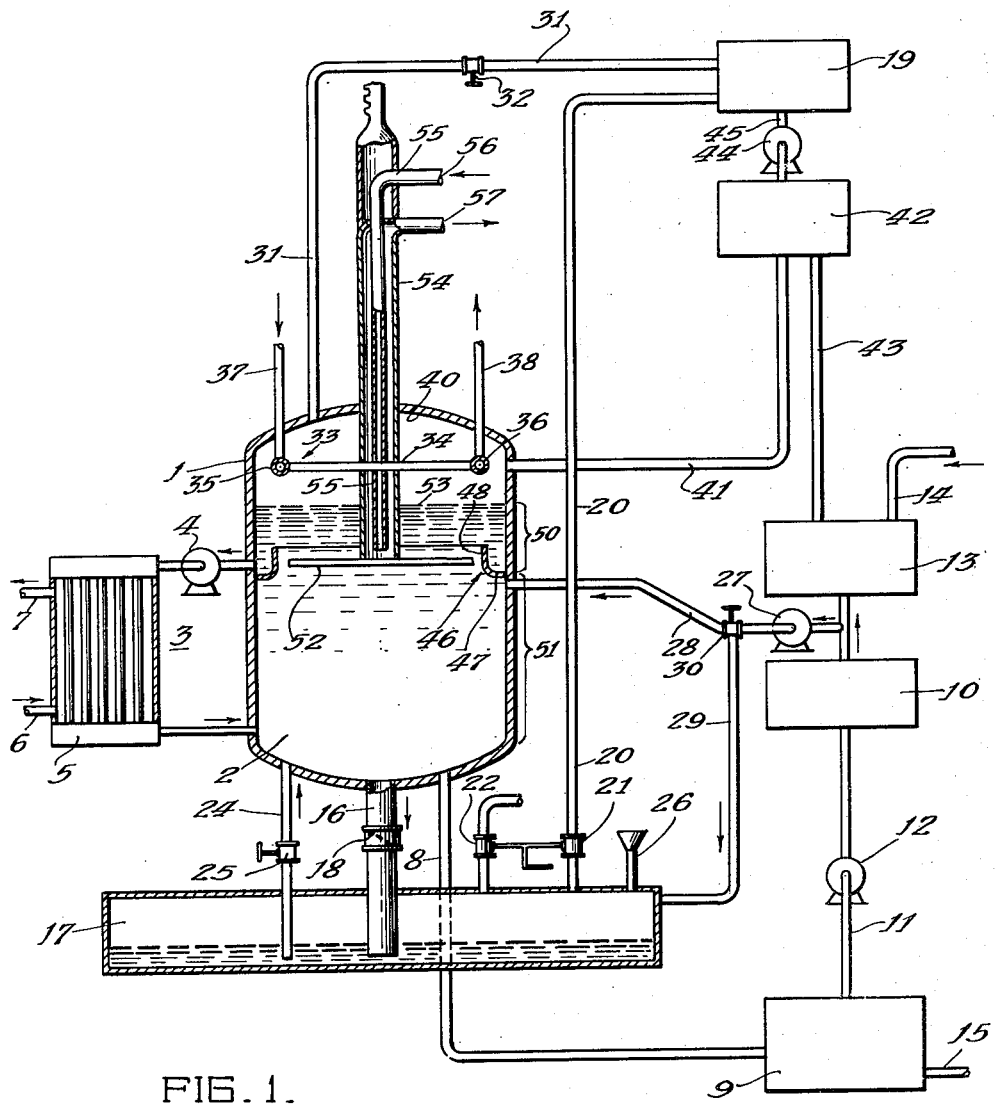
Fig. 1 is a schematic flow diagram of a nuclear fission chain reacting system including a neutronic reactor.

The ability of any neutronic system to remain self-sustaining by the release of neutrons from the uranium may be said, for example, to depend upon the number of new fast neutrons released by fission with respect to the original fast neutrons in the system. Thus the ratio of the number of fast neutrons produced by the fissions to the original number of fast neutrons in a system of infinite size using a specific material is called the reproduction or multiplication factor of the system and is denoted by the symbol K. By making K sufficiently greater than unity to create a net gain in neutrons, and by making the system sufficiently large that this gain is not entirely lost by leakage from the system, a self-sustaining neutronic reactor can be built to produce new elements and fission products, as well as power in the form of heat, by nuclear fission of natural uranium by thermal neutrons. The neutron reproduction ratio denoted by the symbol $r$ in a system of finite size differs from the factor $K$ by the external leakage factor, and must be sufficiently greater than unity to permit the neutron density to rise exponentially in the system. Such rise will continue indefinitely (at least in theory) if not controlled at a desired neutron density corresponding to a desired power output. As a consequence of the exponential neutron density rise, it is necessary to control the reaction within the heat dissipating capacity of the system to an equilibrium value. Thus to obtain a self-sustaining reaction it is desirable to establish a value of $r$ greater than unity thereby obtaining an exponential rise to the desired neutron density and then to maintain $r$ at an average value of unity to maintain this density. In the event that a lower neutron density than that already attained is desired, the value of $r$ must be reduced below unity until the neutron density has fallen to the desired lower level, followed by an indcrease of $r$ to unity to maintain the new lower neutron density.

In a self-sustaining neutron chain reaction more neutrons are evolved by fission than are consumed in fission. For example, about 2.3 neutrons are evolved upon fission of $U^{235}$ and about 2.8 neutrons upon fission of $94^{239}$ per neutron consumed by fission.

Losses in neutrons may be internal or external. Internal losses are caused by absorption within the reactor without fission. Thus, $U^{238}$ which is present in natural uranium absorbs neutrons without fission to yield ultimately $94^{239}$. Moreover, other elements including control rods, moderator, impurities coolant, etc. absorb neutrons. The amount of absorption by such elements is dependent upon the neutron absorption cross-section of each element or isotope. Elements such as aluminum, helium, deuterium, oxygen, fluorine have a relatively low tendency toward neutron absorption and, therefore, their presence in a reactor does not result in a serious loss of neutrons unless large concentrations are present. On the other hand, such elements as cadmium, gadolinium, samarium or boron are high neutron absorbers and concentrations as low as a few parts per million of these elements substantially reduce the amount of neutrons which are available for carrying on the chain reaction.

The effect of impurities on the optimum reproduction factor $K$ may be conveniently evaluated to a reasonable approximation, simply by means of certain constants known as "danger coefficients" which are assigned to the various elements. These danger coefficients for the impurities are each multiplied by the percent by weight of the corresponding impurity, and the total sum of these products gives a value known as the total danger sum. This total danger sum is subtracted from the reproduction factor $K$ as calculated for pure materials and for the specific geometry under consideration. This gives approximately the reproduction factor $K$ for the actual materials. The term "geometry" is here used to denote the physical form of the uranium and the distribution thereof in the moderator.

The danger coefficients are defined in terms of the ratio of the weight of impurity per unit mass of uranium and are based on the capture cross-section for absorption of neutrons of the various elements. These values may be obtained from physics textbooks on the subject and the danger coefficient computed by the formula $$\frac{T_i}{T_u} \times \frac{A_u}{A_i}$$

wherein $T_i$ represents thermal neutron absorption the cross-section for the impurity and $T_u$ the thermal neutron absorption (including fission) cross-section for the uranium, $A_i$ the atomic weight of the impurity and $A_u$ the atomic weight for uranium. If the impurities are in the moderator they are computed as their percent of the weight of the uranium of the system.

As a specific example, if the materials in the reactor under consideration have .0001 percent by weight of H, Co and Ag, and the danger coefficients of H, Co and Ag are 10, 17 and 18, respectively, the total danger sum in $K$ units for such an alysis would be:

$$.0001 \times 10 + .0001 \times 17 + .0001 \times 18 = .0045$$

This would be a rather unimportant reduction in the reproduction factor $K$ unless the reproduction factor for a given reactor, without considering impurities, is very nearly unity. If, on the other hand, the impurities in the uranium are .0001 percent by weight of Li, Co and Rh, the total danger sum would be:

$$.0310 + .0018 + .0050 = .0378$$

This latter reduction in the reproduction factor for a given reactor could be very serious and might well reduce the reproduction factor below unity so as to make it impossible to effect a self-sustaining reaction with natural uranium and a solid moderator such as graphite, but might still be permissible when using heavy water as a moderator, or when using enriched uranium in systems having a high $K$ factor.

An additional loss of neutrons rises due to leakage from the system. This may be decreased by increasing the size of the reactor so that the ratio of external surface to mass of uranium and moderator is increased. Moreover, the neutron leakage may be reduced by use of a neutron reflector such as graphite, deuterium oxide, beryllium, etc. At all events, the reactor must be sufficiently large to compensate for leakage. A more detailed discussion of these factors is found in the above mentioned Fermi and Szilard case and reference is made thereto.

The neutronic reactor may be utilized to develop heat and/or to form new elements such as $94^{239}$ and radioactive fission products. Inasmuch as these products are formed in the uranium in situ, they must be removed from the uranium if their recovery is desired. If the uranium is in massive form, such recovery necessitates shut down of the reaction and removal of the uranium en masse, or the adoption of various arrangements whereby the massive uranium is removed without discontinuing the reaction. Alternatively, the uranium or other fissionable composition may be in the form of finely divided uranium containing material, such as uranium oxide, distributed in the heavy water moderator and forming therewith a fluid slurry. Inasmuch as methods of removing, from the system, the uranium either in massive form or as a slurry for the purpose of recovery of newly created elements and fission products forms no part of our present invention, the particular details of such removal will not be stressed although a brief description of a system incorporating such removal will be described generally.

As indicated above, the neutronic chain reaction is accompanied by the emission of fast neutrons and fission elements. In general, the elements as well as many of their daughter products are extremely radioactive. Thus high intensity gamma rays are released by the system, these rays as well as the neutrons, particularly fast neutrons, being exceedingly dangerous to operating personnel unless massive shields are used as radiation absorbers. The term radiation, as used broadly herein, refers to neutrons of all energies and to alpha, beta and gamma radiation wherever generated in the system.

In the ensuing description, the invention is described as being applicable to a reactor in which the reacting mass is a suspension or dispersion of a fissionable body in a liquid moderator. While the fissionable material may be natural uranium in metallic form, it should be understood that any compound of uranium, such as an oxide as $UO_2$ or $U_3O_8$, or other fissionable material (combined or uncombined, and alone or as an enriching ingredient) may be used to support the chain reaction. Thus, the uranium isotopes $U^{233}$ or $U^{235}$ as well as the element $94^{239}$, for example, in the form of the oxide may be used in our system. We will refer to the reactants as a slurry when the fissionable material in solid state is suspended and distributed in the heavy water moderator and as a lattice when the fissionable material is aggregated and distributed as massive bodies throughout the moderator. In the latter arrangement the uranous material may be in the form of uranium rods or tubes, coated with a protective metal such as aluminum, which has a low danger coefficient, supported vertically in a tank of heavy water.

We have shown in Fig. 1 a flow diagram and partial structural details of a neutronic chain reacting system incorporating a reactor of the slurry type without emphasis on the particular features of our invention as a basis for understanding the principles of our invention.

Referring to Fig. 1, the neutronic reaction is caused to occur in a container or reaction tank 1 partially filled with a slurry 2 which may be pumped through a circulating system generally designated 3 by a pump 4 or other circulating means for the purpose of cooling the slurry. The circulating system 3 is provided with a heat exchanger 5 through which cooling water may be made to flow as shown by an inlet 6 and outlet 7. The slurry 2 may be withdrawn from the reaction tank 1 through an outlet line 8 for purposes of purifying the moderator with respect to impurities abraded from the circulating system 3 or other parts with which it comes in contact, and for recovery of $93^{239}$, $94^{239}$ and fission products in the slurry. In such a reaction system wherein the uranous material is in the form of small particles suspended in the moderator, the uranous material including the newly formed products may be separated from the moderator in a separating chamber 9 connected with the line 8.

Chamber 9 is provided with separating means for separating the solid matter from the slurry such as by evaporation of the heavy water which is delivered to a purifying tank 10 through the line 11 and pump 12 where the water may be purified by distillation or other methods. The purified heavy water is stored in a tank 13, the supply therein being maintained from an outside source such as through the pipeline 14. The uranium bearing material separated from the moderator is withdrawn from the chamber 9 in any desired manner, as through a pipe line 15, whereupon the elements 93, 94 and fission products may be separated from one another. Inasmuch as the separation of these products from the uranium forms no specific part of our invention, the process of separating these products is not discussed in detail herein.

In addition to the outlet 8, through which a portion of the slurry is removed from the system, we have shown another pipe line 16 connected with the bottom of the tank 1, the line 16 being of large diameter for dumping the slurry from the reaction tank 1 into a slurry reservoir 17 in the event that the safe operating neutron density has been or is about to be exceeded. The line 16 between the tank 1 and reservoir 17 is provided with a check valve 18 maintained closed by helium pressure from a helium pressure tank 19 admitting helium to the reservoir through a line 20 having a normally open pressure supply valve 21 in series therewith. A pressure release valve 22 is connected to the reservoir 17 so that the helium pressure in the reservoir 17 may be reduced in an emergency by opening the valve 22. Such reduction in pressure in the reservoir 17 allows the check valve 18 to open and the slurry to pass into the reservoir 17. The pressure supply valve 21 is closed simultaneously with the opening of the valve 22 in response to an emergency control system as appears hereinafter in greater detail. Normally, i. e., except when the valve 21 is closed and the valve 22 is opened, the pressure in the reservoir 17 is maintained greater than that in the reaction tank 1 and the slurry may be transferred from below the surface of the slurry in the reservoir 17 to the tank 1 through a pipe line 24 having a valve 25 to control the slurry flow.

When utilizing a slurry which is gradually removed through the line 8 for recovery of new elements and fission products, any desired or uniform concentration of uranous material may be maintained in the slurry by introducing additional uranous material into the slurry reservoir 17 through a line 26, while additional heavy water ($D_2O$) may be delivered by pump 27 from the heavy water reservoir 13 either to the reaction tank 1 through a line 28 or to the slurry reservoir 17 through a line 29 controlled by a three-way valve 30.

As indicated above, the chain reaction is initiated by nuclear fissions produced by neutrons slowed to thermal energy by collision of faster neutrons with the heavy water. Some of these neutrons are effective in decomposing a portion of the heavy water moderator and consequently, we provide means causing recombination of the products of decomposition thereby conserving the heavy water for reuse in the system. Referring again to Fig. 1, we provide an atmosphere of helium over the slurry 2 in tank 1 to dilute the uncombined gases to a degree such that formation of an explosive mixture is prevented. The helium is supplied from the reservoir 19 through a pipe line 31 and valve 32 entering the upper portion of the tank 1, thereby directing the gases over a grid shown diagrammatically at 33 positioned in the upper portion of the tank 1 over the normal level of the slurry 2. The grid 33 is preferably a series of pipes 34 extending between an inlet header 35 and outlet header 36 through which hot gas can be forced such as through an inlet 37 and outlet 38 to maintain the grid pipes 34 above the recombining temperature of the uncombined heavy water gases. Following recombination, the vapor condenses on the top of the reaction tank 1 which is preferably semispherical in shape, as shown at 40. Following recombination of the gases, the helium is passed through a pipe line 41 to a helium purifier 42 which removes any heavy water vapors entrained in the helium, the heavy water being led to the heavy water storage tank 13 through pipe line 43 and the helium being returned under pressure to the reservoir 19 by a pump 44 in a pipe line 45 between the helium purifier 42 and reservoir 19.

To provide more efficient circulation of the slurry 1, we provide a circulation baffle generally designated 46 within the reaction tank 1 slightly below the inlet from the tank to the circulator system 3. More particularly we provide the baffle in the form of an annular ring 47 affixed to the wall of the tank 1 just below the circulating system 3 inlet, the ring having an integral annular flange portion 48 extending upwardly beyond the inlet. The baffle 46 prevents flow of the slurry merely along the walls of the reaction tank 1 and also prevents the majority of bubbles formed in the lower portions of the slurry from entering the circulating system. The baffle is, therefore, effective in minimizing erosion in the heat exchanger 5 caused by bubbles in the circulating slurry. However, in spite of the baffle, the top surface of the slurry will be continually disturbed by circulatory currents.

The helium pressure in the reaction tank 1 is preferably somewhat less than the pressure applied to the reservoir 17 to maintain the check valve 18 in a closed position. Such pressure differential may be maintained by the valve 32 in the line 31 between the helium reservoir 19 and the reaction tank 1.

In accordance with the principal teaching of our invention, we control the neutron density within the reaction tank 1 in a new and novel manner by dividing the volume of the fluid moderator or slurry into two unequal volume portions, the larger portion conforming to approximately critical size conditions as defined above and the smaller portion conforming to a volume incapable of maintaining or materially contributing to a self-sustaining neutronic reaction. It is thus that the changing and swirling surface of the slurry is separated from the larger portion. The total volume of the slurry in the reaction tank 1 will be referred to as the operating volume, the larger portion as the effective critical size or active volume and the smaller portion as the inactive volume of the slurry. The division of the operating volume into these two portions may be effected by a so-called control plate as hereinbelow explained.

The reproduction ratio for a reactor volume of true critical size differs from the reproduction factor by reason of leakage of neutrons from the surface of the reactor, as indicated above. The inactive volume of the reactor tends to decrease the leakage loss and may even contribute some fast neutrons to the neutronic reaction by reflection through the control plate. Consequently for a reproduction ratio of unity the active volume or effective critical size may be slightly smaller in volume than the true critical size. The action of the inactive volume in contributing neutrons to the reaction is explained more fully below.

Referring again to Fig. 1, we have shown the slurry 2 as divided into an active portion 51 and an inactive portion 50 by a neutron absorbing control plate 52 extending transversely of the reaction tank 1. In normal operation the control plate 52 is immersed in the slurry and is below the operating level 53 of the slurry operating volume. The control plate 52 is affixed to and is supported from outside of the reaction tank 1 by a tubular support member 54 movable in a direction normal to the operating level 53 of the slurry volume for purposes of control as hereinafter explained. The member 54 is preferably in the form of a tube or conduit enclosing in telescopic relation a second tube or conduit 55 through which cooling water may be forced as shown by the inlet 56. The cooling water flows downwardly through the conduit 55 and up within the member 54 cooling that portion of this member not immersed in the slurry during operation of the system, the water being withdrawn at the outlet 57.

We have shown in Figs. 2 and 3 enlarged details of the control plate 52 shown in Fig. 1 and a preferred plate construction. Referring to Figs. 2 and 3 the control plate 52 comprises an upper steel disc 60, slightly conical in shape with its apex higher at the center supported by the tubular member 54, and a lower metal disc 61. Both of these discs may be perforated to permit free movement of liquid. The two discs are joined at their periphery. Since the area of these discs is rather large, we prefer to support the disc 61, from the member 54 and the disc 60, through triangular braces 62 extending radially from the center of the discs. The material of disc 61 is preferably of cadmium, boron or other composition having high neutron capture cross section and may be from one-half to one inch in thickness. While a thinner cadmium plate would be sufficient as a neutron control plate, structural strength must be considered. Alternatively, the disc 61 may be composite of steel and cadmium, the cadmium being applied to the lower surface of a steel plate. Such construction allows use of a somewhat smaller thickness of cadmium, the rigidity being supplied by the steel plate overlying the cadmium.

The control of the system is accomplished by axial movement of the control plate 52, within the reaction tank 1, such movement being imparted to the control plate preferably by axial movement of the tubular support member 54 extending through the top of the reaction tank 1. Inasmuch as the inside of the tank is subjected to helium pressure and the helium is saturated with heavy water vapor, a pressure seal is provided between the support member 54 and its place of entrance into the reaction tank. Referring to Fig. 4, the top 40 of the reaction tank 1 is pierced and fitted with a bushing 70 which is affixed to the top of the tank by welding or ring plates 71. The inside diameter of the bushing 70 is slightly larger than the tubular member 54 that supports the control plate 52 to allow a sliding fit therewith. The bushing 70 is provided with threads 72 at its upper end and is topped by a threaded cap 73 pressing a packing washer 74 against the member 54 to prevent the leakage of helium from the top portion of the reaction tank around the member 54. As a further precaution to prevent leakage, the bushing 70 is undercut on its inner surface with a groove 75 connecting with a passageway 76 through the bushing and to a helium supply line 77. Helium maintained at a pressure in the line 77 slightly greater than that in the reaction tank 1 positively assures against leakage of helium containing heavy water vapor through the bushing 70 and packing washer 74.

The control plate 52 acts as a slow neutron absorbing partition substantially parallel to the surface of the slurry and limits the slow neutrons passing from the relatively inactive portion 50 of the slurry to the more active portion 51 whereby the portion 50 contributes a minimum of neutrons to the neutron density produced in the active slurry portion, and variations in surface level therefore have a minimum effect on the reaction. Not only does the control plate act as a partition, but as a neutron "sink," reducing the neutron density adjacent the plate particularly on the lower side thereof thus dividing the operating volume into active and inactive portions. The operation of the control plate may be clarified by reference to Fig. 5.

Referring to Fig. 5, the tank 1 is shown as filled with the operating volume of slurry 2 to the upper operating level 53 and the control plate 52 in a position A, dividing the operating volume into an upper inactive portion 50 and a lower active portion 51. We have plotted as an illustrative curve 80, in full line detail, in Fig. 5, the neutron density as ordinates from and along the central axis $O-O_1$, of the tank 1, the curve representing neutron density distribution in the active portion 51 of the slurry for the control plate 52 in position A. It will be noted that the neutron density decreases gradually from the center of the active portion 51 to a low value adjacent the bottom of the tank 1 and decreases rapidly adjacent the control plate 52 in position A.

The "sink" action of a control rod of neutron absorbing material is exemplified by the rapid decrease in neutron density adjacent the control plate as shown by the upper portion of the curve 80. Some thermal neutrons, that in the absence of the plate would enter into the reaction and produce new neutrons by fission, are absorbed by the plate, decreasing the neutron density not only by reason of the absorbed neutrons but by the number of neutrons that would be developed through fission by the neutrons otherwise absorbed. It is for this reason that the neutron density decreases at a greater rate and the action of the plate is referred to as a "sink" whereas the normal decrease adjacent other surfaces of the reactor is steeper as shown by the slope of the curve 80 adjacent the bottom of the reaction tank 1 in Fig. 5.

Assuming that the size of the slurry body 51 between the curve 80 and the axis $O-O_1$, is just sufficient to maintain a neutronic reaction and the size of the inactive portion 50 is below the critical size, decrease in the effective size of the active portion will result in a decay of the reaction while any increase in the effective size will cause an exponential rise in the reaction. For example, assume the control plate 52 is raised to a new position B at which position the active portion is increased in volume as represented at 81, the inactive portion being decreased by an equal amount as represented at 82. Under this condition, the neutron density distribution along the axis O—O₁ is represented by the ordinates of the dashed line curve 83. The resulting increase in neutron production arising by so moving the control will be effective in producing an exponential rise in the rate of the neutronic reaction. Such a rise ultimately must be terminated to maintain the neutronic reaction within the heat dissipating capacity of the system. Thus, the reaction may be stabilized at a neutron density value within the heat dissipating capacity of the system by lowering the control plate to the position A at which it was assumed the neutron chain reaction was just self-sustaining or the reaction may be terminated by lowering the plate 52 to a position below the position A and retaining it at this position until the neutron density has decreased to a lower value. If the control plate is retained in a lower position than position A only until the neutron density has changed to a somewhat lower density than initially attained and the control plate is then raised to its initial position at A, the neutronic reaction will be stabilized at the lower density. Consequently, vertical movement of the control plate offers an effective control over the desired neutron density within the reaction tank. The active portion 51 for a position of the control plate at which the reaction is just self-sustaining and stabilized corresponds to the effective critical size as defined above, whereas for lower positions of the control plate the neutronic self-sustaining reaction will decay since the active portion volume is less than effective critical size at which the reproduction ratio is unity. For higher positions of the control plate such as at B, the reaction will increase in density exponentially with time since the active portion volume is then greater than that corresponding to effective critical size.

It will be apparent that the establishment of a control of the type herein described effectively blocks off the upper portion of the reactor from the lower portion and divides the reactor into two separate portions since thermal neutrons do not pass from one portion to the other to any substantial degree. Consequently, little reaction can take place in the upper portion due to its small size and correspondingly high leakage despite the fact that the slurry in the upper portion may be of a composition such that it would sustain a chain reaction is sufficiently large in size. The control plate limits the level at which a self-sustaining chain reaction takes place to a zone below the level of the liquid and the effect of variations in the level and ripples or waves which are established on the surface is thereby substantially minimized or even wholly eliminated.

It should, of course, be understood other portions of the reactor may be blocked off or substantially isolated in the same manner. For example, a portion of the reactor adjacent to the bottom thereof may be blocked off if desired.

The materials of which the control plate may be made, such as cadmium, boron or gadolinium or other absorber, preferably having a danger coefficient above 100, have a larger neutron absorbing action for slow neutrons than for fast neutrons. Some fast neutrons incident on the control plate from the active volume of the reactor will penetrate the plate, will be slowed to thermal energy in the inactive volume and will produce fission in the inactive volume with resultant liberation of new fast neutrons which may have sufficient energy to penetrate the control plate. Furthermore, some additional fast neutrons may enter the inactive volume by penetration of the control plates and be reflected by the moderator of the inactive volume and still have sufficient energy to reenter the active volume through the control plate and produce fission.

It will be fully appreciated now that the self-sustaining neutronic reaction is initiated merely by exceeding the effective critical size of the slurry at which the reproduction ratio slightly exceeds unity. Consequently, any volume of this slurry of similar configuration to the active volume portion contained in the reaction tank, will likewise support a self-sustaining neutronic reaction. It is, therefore, exceedingly important that the slurry reservoir 17 should be of such configuration that even with a maximum quantity of slurry therein, a self-sustaining reaction cannot be either initiated or maintained in this reservoir. The reservoir should, therefore, be made to have a large surface to volume ratio so that the neutron losses from the surface thereof exceed the minimum surface losses necessary to allow a self-sustaining reaction by making the slurry reserve tank of large cross sectional area and with minimum depth, with small cross section and maximum depth, or as small mutually separated tanks. In addition, the reservoir may be constructed of or contain cadmium plates or baffles which effectively absorb neutrons; thereby eliminating all possibility of developing a self-sustaining reaction in the slurry outside of the reaction tank.

The neutronic reaction within the reaction tank 1 is dependent upon the nuclear fission of the $U^{235}$ constituent of the uranous material of the slurry when subjected to thermal neutrons, and also upon fission of $94^{239}$ as $U^{235}$ is used up. During the fission process, fast neutrons are emitted by the uranium and these fast neutrons are slowed to thermal energy, this being the function of the heavy water moderator. However, there must be sufficient uranuim in the slurry to intercept the neutrons once they have reached thermal energy. Consequently, the ratio of uranium atoms to the atoms of the moderator producing the slowing effect must be such that the slowing is sufficient, the availability of uranium in the paths of the slow neutrons is adequate, and the neutron loss occasioned by resonance capture is insufficient to overcome the neutron gain occasioned by the fission process, so that a self-sustaining neutronic reaction is possible.

Figure 6:
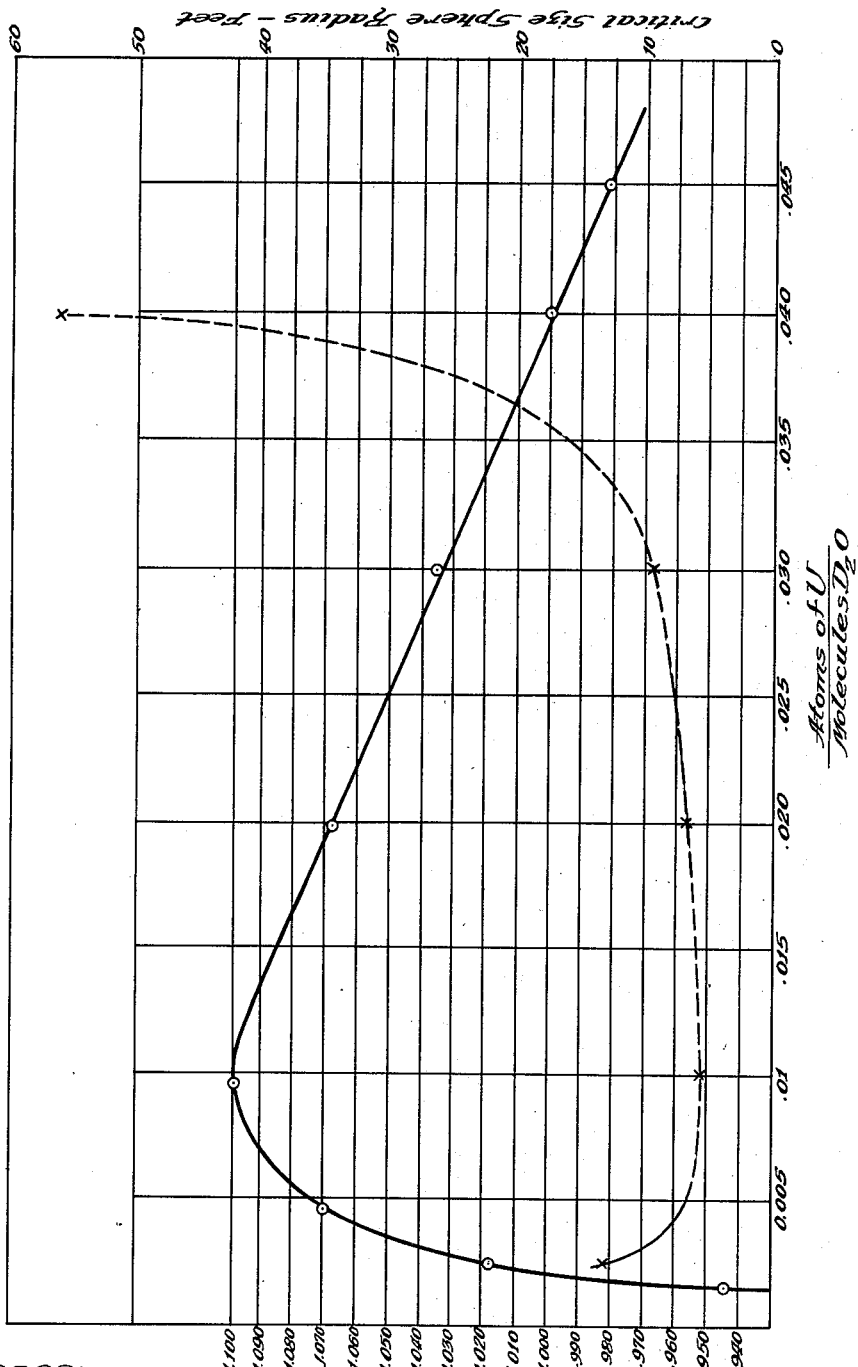
Fig. 6 is a set of curves representing reproduction factor and critical size for various uranium to moderator ratios.

The full line curve shown in Fig. 6 has been drawn for a moderator of heavy water of available purity from calculations based on an absorption cross-section of $0.004 \times 10^{-24}$ cm.², per molecule of the heavy water, the ordinates representing values of reproduction factor K, the abscissae being various ratios of uranium atoms to heavy water molecules of the slurry.

From the full line curve of Fig. 6 it will be appreciated that as the concentration of uranium in the heavy water is increased, the value of K increases from values below unity and reaches a peak of 1.10 at a concentration of about 0.01 atom of uranium per molecule of heavy water. Since the system will operate equally as well, with respect to slurry concentration with a reproduction factor slightly over unity for a high and low concentration of uranium, and since uranium is at present cheaper to produce than heavy water, the concentration, which is used to provide the slurry, is preferably in the higher range, such as at about 0.023 atom of uranium per molecule of heavy water which, neglecting the very low danger coefficients of oxygen content of the uranium oxide preferably used, provides a K factor of 1.060. When using $UO_2$ as the uranium source this corresponds to approximately one part oxide to four parts heavy water by weight. On a volume basis, the oxide solids represent about 4% of the slurry volume.

From the full line curve, Fig. 6, it will be appreciated further that a low ratio of uranium to moderator, such as 0.004 atom of uranium per molecule of moderator may be used. Such use reduces erosion of the slurry circulating system and pumps, but small variations in concentration cause greater variations in the reproduction factor over this portion of the curve, than to the right of the maximum K value, rendering the system more critical to control. Consequently, we prefer to utilize the higher uranium-to-moderator ratio indicated above.

The particle size of the uranium oxide is preferably below 2 microns ($\mu$). This size of the individual particles is dictated principally by the abrading action of the particles on the pumps, valves and heat exchanger tubes. For larger particle sizes erosion may be excessive. While erosion does not materially affect the mechanical operation of the system, it tends to poison the system by inclusion of iron and other metals worn from the slurry circulating system. However, continued circulation of the slurry reduces the particle size by abrasion of the oxide particles upon each other. For example, a slurry originally of 50μ to 70μ size was reduced to a point where 85% of the material was below 2μ by pumping through a circulating system for 60 hours at 20 feet per second. Consequently, in the initial stages of operation, a somewhat larger slurry particle size may be tolerated although sizes below 2 microns are preferred. As operation continues, the particle size will decrease, and for particle sizes below .001μ the erosion may be no more than that produced by a solution of the same density. Alternatively, the slurry may be pumped through an auxiliary system prior to use in the neutronic reactor to reduce the uranium oxide particle size. Such an auxiliary system may be constructed of materials having very low danger coefficients so that the slurry, while contaminated to a small degree, has less neutron absorbing impurities than it would have if it had been initially run in the chain reacting system. Thus, an auxiliary system may be made of materials such as aluminum or beryllium having a low danger coefficient where as such materials used in the reaction circulating system would be subject to excessive wear and premature failure.

Theoretically, the size and distribution of the uranous, i. e. uranium-bearing, particles in the slurry affect the value of the reproduction factor K because the resonance loss increases with decrease in particle size. Thus, for a given ratio of uranium volume to total slurry volume, the value of K will vary, increasing to a maximum, and then decreasing with decrease in particle size. This effect has no practical importance, however, in our system because the size range over which variation in K is material is outside the limits imposed by circulation of the slurry. For example, to provide an optimum reproduction factor the particles would have to be one centimeter or larger in diameter. Conversely, while decrease in particle size lowers the reproduction factor somewhat, the loss in neutrons by reason of the larger surface resonance capture provides a net gain in the production of element 93 which converts to element 94 with beta decay.

The structural form of the reactor may be of any desired shape such as spherical, cylindrical, parallelopiped or combination thereof, as long as the mass thereof is sufficient and is concentrated to reduce surface losses within the confines as dictated by the maximum reproduction factor. We have shown in Fig. 6 a curve in dashed line detail wherein the relation of critical size of a spherical reactor of radius R to the slurry concentration is approximately given. From the value of K corresponding to any slurry concentration, the minimum radius at which the reaction becomes self-sustaining represents the critical size for that condition. A spherical type of reaction tank represents the most economical utilization of the slurry although for ease in construction and control, the cylindrical form may be preferred.

Referring again to Fig. 1, we have shown a system wherein the reaction tank 1 is cylindrical and adapted to contain an operating volume of slurry of depth approximating the diameter. For a minimum size and consequent savings in heavy water, it may be desirable to provide a slurry concentration providing the highest practical reproduction factor. Consequently, the minimum cylindrical reaction tank volume would be approximately 11 feet in height and in diameter. However, the reaction tank may be somewhat larger to allow for a vapor space over the slurry and for variations in slurry concentration, possible poisoning of the reaction by the formation of neutron absorbing fission products, reduction in the reproduction factor by impurities in the uranium oxide including material removed by erosion of the circulating system, and other variables. These variables may be allowed for by calculating the total effect of these variables on the reproduction factor and a reasonable reduction in the factor may be considered to be approximately 4%.

Using the 4% design safety factor to insure a reaction notwithstanding this reduction in K, the reaction tank would be made approximately 14 feet in diameter, the depth of the slurry in the tank being somewhat less than 14 feet, depending on the actual neutron absorbing impurities in the slurry. For theoretically pure materials and for a slurry concentration of about .01 uranium atom per molecule of heavy water, the depth to obtain a self-sustaining neutron reaction in a 14 foot tank would be approximately 6 feet. Consequently, to initiate the reaction in the pile, the control plate is positioned just above one-half the expected depth of the slurry, the reaction tank filled to the expected depth and the control plate raised to a point initiating the chain reaction. If the expected depth is insufficient to obtain the reaction, the control plate is lowered to a position slightly above its initial position, additional slurry introduced to the tank, the control plate again raised to the point at which the volume below the plate may slightly exceed critical size, repeating this process until the effective critical size is slightly exceeded whereupon the reaction may be stabilized at any intensity by lowering the plate to provide effective critical size conditions therebelow.

In addition to the cooling system shown in Fig. 1, the entire apparatus including the reactor comprising tank 1 and its contents, heat exchanger 5 and associated pump 4, is immersed in water for cooling and shielding purposes within a concrete or other good neutron and gamma ray shield for protection of operating personnel. This circulation system and shield is not shown in Fig. 1 for the sake of clarity.

In the operation of the system shown and so far described in Fig. 1, the chain reaction within the reaction tank 1 develops considerable energy in the form of beta and gamma rays, as well as kinetic energy from the fission products. A great portion of this energy is released inside the reactor in the form of heat and is absorbed by the heavy water of the slurry and withdrawn from the system by circulating the slurry through the heat exchanger 5, the heat being transferred to the cooling water flowing between the inlet and outlet piping 6 and 7. The heat developed by the neutronic reaction may be removed in a number of different ways or combinations thereof. For example, the heat may be dissipated by flowing a coolant over the external surface of the reactor, by withdrawing a portion of the slurry from the reactor and cooling the slurry exteriorly, by circulating a coolant through conduits in the reactor and above the slurry level to condense heavy water vapor in the region over the slurry, by flowing the coolant through conduits immersed in the slurry, or by a combination of these methods.

Figure 7:
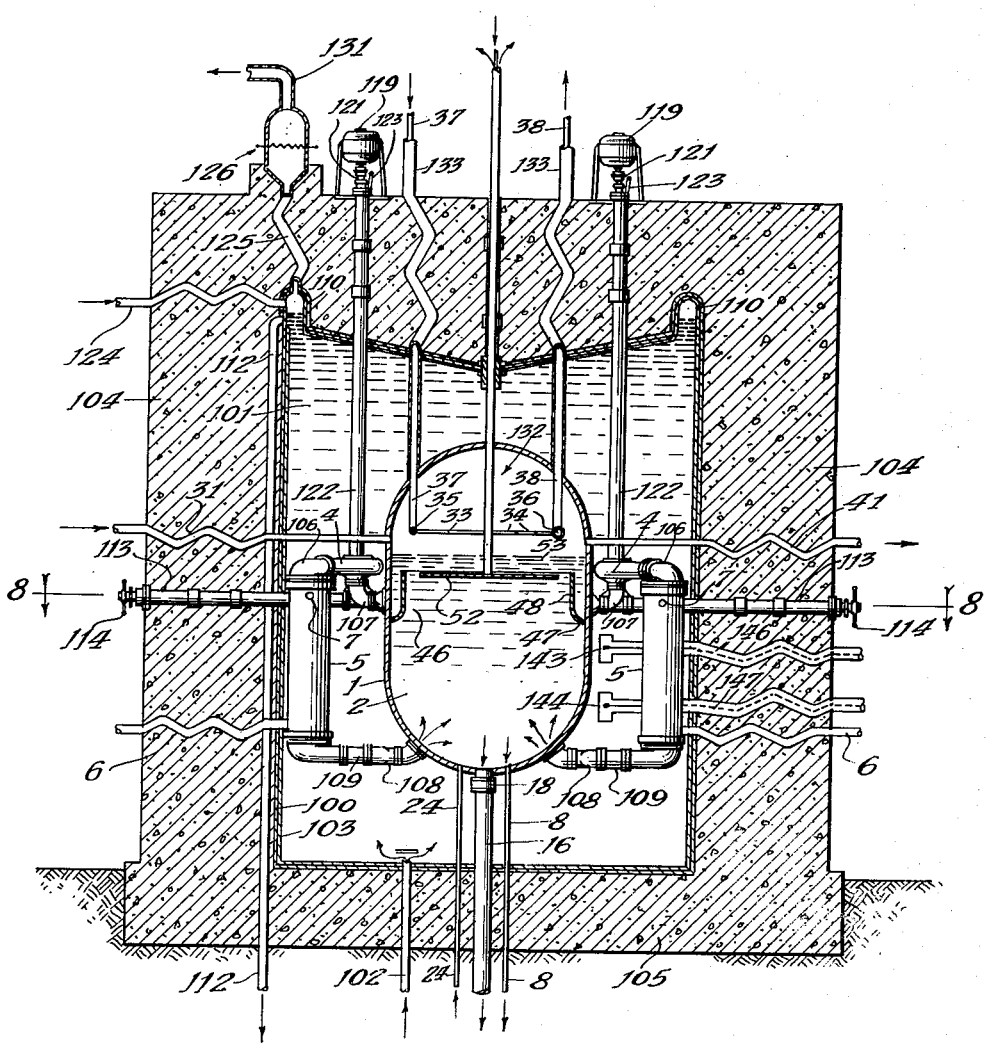
Fig. 7 is an elevation view partly in vertical cross-section of one structural embodiment of our invention showing the principal features of our nuclear chain reacting system.
Figure 8:
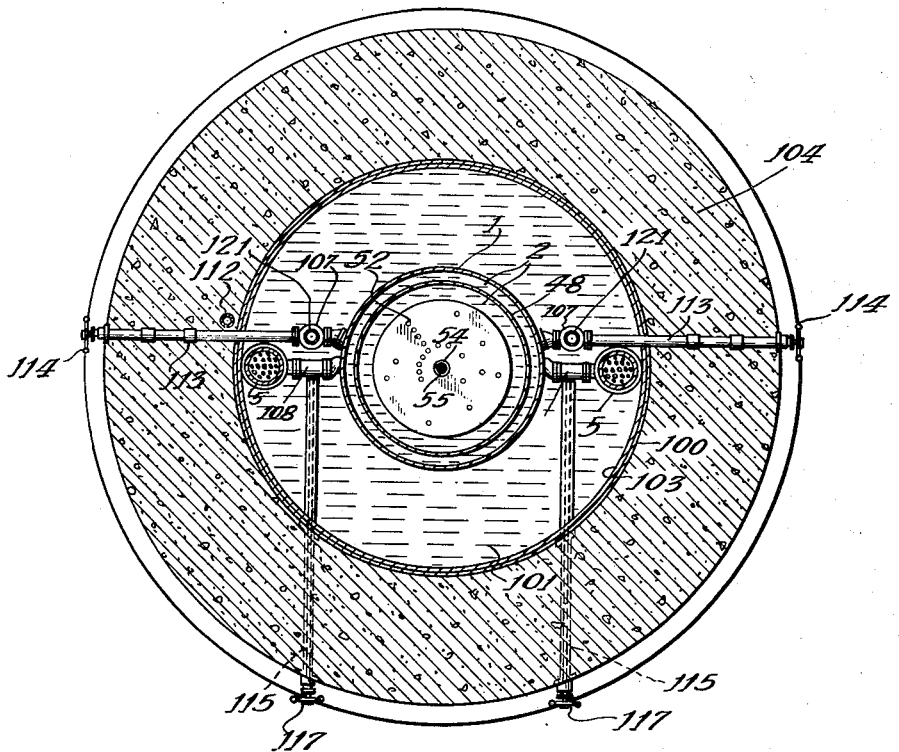
Fig. 8 is a plan view partly in cross-section of the apparatus shown in Fig. 7 taken along the lines 8—8 thereof.

We have shown in Figs. 7 and 8 the apparatus previously described in part, contained within radiation shields of water and concrete, the parts previously described being similarly referenced as in the preceding figures and wherein the reaction tank, slurry circulating pumps and heat exchanger systems are immersed in water for cooling purposes.

Referring to Figs. 7 and 8, and in particular to Fig. 7, the reactor comprising the reaction tank 1 and slurry 2 is of stainless steel and is supported within an auxiliary steel immersion tank 100 containing water 101 introduced therein by pipe line 102 for cooling the external surface of the tank 1 and other auxiliary apparatus to be described. The internal surface of the tank 100 is lined with lead sheathing 103 to absorb gamma rays liberated by the neutron chain reaction developed in the tank 1 and is surrounded by a massive concrete wall or shield 104 supported on a concrete base 105. This shield is for the purpose of absorbing and limiting the escape of gamma rays not absorbed by the water 101 and the lead sheathing 103. The concrete shield also serves as an absorber for neutrons slowed by collision in passing through the water 101 and is preferably composed of materials holding a maximum of water. The entire structure is supported on the earth which serves as an auxiliary shield at the base of the apparatus so that the concrete base 105 need not be as thick as the side walls of the shield 104. Likewise, the lead shield 103 over the side walls and top of the enclosing tank 100 may be omitted on the bottom thereof.

Surrounding the reaction tank 1, we provide means to withdraw heat therefrom, such as by a heat exchanger system all components of which are of materials such as steel, wherein the impurities, if any, have low neutron absorption danger coefficients so that particles abraded therefrom will not materially affect the chain reaction. We have shown two heat exchangers 5 in the drawings although it will be appreciated that any other number may be utilized depending entirely upon the rate at which the reaction is carried forth. Each of the heat exchangers 5 is connected with the reaction tank 1 through inlet piping 106, pump 4, and valve 107 near the top thereof, and near the base thereof through the outlet valve 108 and piping 109 so that the slurry 2 may be circulated up through the reaction tank 1 and down through the heat exchangers 5. The exchangers are each cooled by water introduced near the base of the exchangers through the piping 6 and vented near the top thereof through the outlet 7 into the enclosing tank 100 where it merges with the water 101. The cooling water flowing through the heat exchangers, as well as the water introduced through the pipe line 102, may be vented from the system through a channel 110 which completely surrounds the tank 100 at the upper edge thereof, the water finally being drawn off in the line 112. The piping between the reaction tank 1 and the heat exchangers, as well as the internal construction of the heat exchangers, is so designed as to minimize the amount of slurry held over during the heat exchange cycle inasmuch as the heavy water moderator comprising one of the ingredients of the slurry is at present relaitvely expensive. While the heat exchangers could be located outside of the concrete shield 104, such positioning would increase the slurry holdover while still necessitating additional radiation shields enclosing these portions of the system.

The heat exchanger inlet valves 107 are controlled by rod type valve stems (not shown) extending in horizontal directions through close fitting iron guides 113 extending through the concrete shield 104 terminating in hand wheels 114 to actuate the valves. The valve stems are made close fitting with the guides 113 to minimize radiation leakage through the concrete shield. The outlet valves 108 in the pipe lines 109 between the exchangers 5 and the reaction tank 1 are similarly controlled, as best shown in Fig. 8, through valve stems (not shown) extending in horizontal directions through guides 115 imbedded in the concrete shield 104 to hand wheels 117. The slurry circulating pumps 4 are shown as of the centrifugal type and are driven by motors 119 through shafts 121 extending from the pumps 4 to the outside of the shield 104 through closely fitting conduits 122. The motor bearings are lubricated and leakage is prevented by filling the conduits 122 with heavy water introduced therein through the piping 123. Such lubrication assures satisfactory bearing life, prevents loss of slurry into the external cooling water and prevents contamination of this water with fission products produced by neutron bombardment of the uranium in the slurry.

The reaction tank 1 is permeable to neutrons so that the water 101 in the surrounding tank 100 is subjected to relatively high neutron densities during operation of the system. The neutrons not only produce radioactivity in the water 101 but also decompose the water 101 into its gaseous constituents, oxygen and hydrogen. The oxygen may be radioactive and provide a biological hazard if the gases were vented to the atmosphere. We, therefore, recombine the uncombined gases produced by neutron bombardment of the water 101 inasmuch as the recombined elements, in water form, may be disposed of without the attendant hazard, such as to a deep well.

Referring to Fig. 7, the uncombined gases are collected in the channel 110 which completely surrounds the tank 100 at the upper edge thereof and are diluted with helium introduced to the channel 110 by a pipe line 124 to prevent formation of an explosive mixture. The dissociated gases are then directed by the helium flow through a pipe line 125 to a recombination chamber 126 which may be located on the top of the concrete shield 104, as shown.

As best shown in Figs. 9 and 10, the recombination chamber 126 comprises a lower housing 127 communicating with the pipe line 125, and an upper bell-shaped housing 128 supported at the inverted open end thereof by the lower housing 127 through an intermediate insulating material ring 129. The ring 129 supports a plurality of heaters 130 such as electrical resistance elements. The heaters 130 may be heated electrically by connection to the electric power mains as shown in Fig. 10. The uncombined gases are driven over the heaters 130 which recombine these gases to form water vapor which is entrapped by the helium and withdrawn from the upper housing 128 through a pipe line 131 whereupon these vapors may be condensed, the water removed, and the helium stored in the reservoir previously referred to in connection with Fig. 1. Alternatively, or supplementing the heaters 130, we may provide catalytic recombining means such as platinized charcoal over which the uncombined gases are passed. We may also utilize a grid of pipe lines carrying hot gas to heat the grid to the recombining temperature of the uncombined gases.

The reaction tank 1 is so designed that under normal operating conditions the slurry level 53 is below the top portion 40 of the tank 1, leaving a gas chamber 132 therein. Under the high neutron intensity present in the slurry volume, some of the heavy water moderator of the slurry becomes decomposed, the uncombined gases rising through the slurry 2 into the chamber 132 above the normal slurry level 40. We provide means within the reaction tank 1 to recombine the gases formed by decomposition of the heavy water as referred to in connection with Fig. 1. We have shown a grid 33 of tubular members 34 connected between an inlet header 35 and an outlet header 36. Hot gas is admitted through the line 37 to the inlet header 35, passed through the tubular grid members 34, and removed from the header 36 through an outlet line 38. The inlet and outlet lines 37 and 38 are covered with heat insulation 133 which minimizes transfer of heat from the hot gases to the concrete shield 104 and water 101. In this manner, the grid 33 is maintained above the recombining temperature of the uncombined gases of the heavy water, these gases recombining upon contact with the grid. However, to prevent high concentration of uncombined gases within the chamber 132, we circulate an inert gas such as helium through the chamber to dilute these gases and thereby prevent the formation of an explosive mixture. More particularly, as shown in the drawings, Figs. 7 and 8, we provide an inlet pipe line 31 leading through the concrete shield 104 and into the upper portion of the reaction tank 1, this line being fed with helium which flows into the reaction tank, thereby diluting the gases of decomposition and driving them over the hot grid 33 where they recombine to form heavy water vapor. The helium and vapor is removed through the pipe line 41 whereupon the heavy water is condensed in the helium purifier referred to in connection with Fig. 1, the heavy water and helium being reused in the system.

Recovery of the newly created elements 93 and 94, as well as the fission products, may be obtained by withdrawing a portion of the slurry 2 through the pipe line 8. The concentration of these products of the neutronic reaction may be determined easily after initiation of operation of the system and the concentration of these products maintained constant in the slurry by bleeding off small quantities of the slurry while the chain reaction is continuing. No loss of operation time ensures by this method of removing the products.

We have not shown in Figs. 7 and 8 the slurry reservoir and emergency dumping system, inasmuch as this has already been described in connection with Fig. 1. However, the slurry is introduced into the reaction tank through the pipe line 24 with the control plate 52 in a position lower than the expected operating position. Thus the control plate 52 is positioned such that the volume of the reaction tank 1 below the control plate is considerably less than the effective critical size volume to prevent initiation of a self-sustaining chain reaction. The operating position of the control plate is controlled in response to the neutron density adjacent the reaction tank 1 by an ionization chamber 143 positioned adjacent the tank 1 in a region of relatively high neutron density. The mode of initiating and controlling the reaction is described more particularly below. The slurry is retained in the reaction tank 1 by external pressure effective upon the check valve 18 in the dump line 16, although the slurry may be withdrawn through the dump line in case of emergency by releasing the pressure normally maintaining the valve 18 in a closed position. Such dumping may be controlled by a second ionization chamber 144 similarly positioned as the ionization chamber 143. Each ionization chamber has a shielded lead 146 and 147 respectively, extending through the concrete shield 104 for connection to an external control circuit shown in Fig. 11.

Reference is made to Fig. 11 which shows diagrammatically one form of automatic control and safety circuit which we may use for regulating the output of the system. Referring first to control circuit A, the control ionization chamber 143, referred to above as being placed adjacent the reaction tank 1, is provided with a filling of boron fluoride. A central electrode 150 is provided within the chamber 143 and connected to the lead 146 extending outside of the system enclosed by the concrete shield 104, shown in Fig. 7, to a movable contact 151 on the resistor 152. Resistor 152 is connected across a relay coil 154, one side of which is connected to the battery 155, the other of which is connected to the shield 156 around the lead 146. The shield 156 is grounded preferably at 157 adjacent the end of chamber 143 as well as externally of the system as shown at 159. The tank 1 is permeable to neutrons developed within the slurry 2 and alpha ray ionization due to neutron reaction with the boron within the chamber 143 is proportional to the neutron density. Thus the current in resistor 152 varies in accordance with neutron density surrounding the ionization chamber. Relay coil 154 operates a relay armature 160 which is spring biased by spring 161 to contact one motor-control contact 162, and is urged by current in the relay coil 154 to contact a second motor control contact 164. Contacts 162 and 164 connected to the outside of a split winding of a reversible motor 165 through lines 166 and 167, the center connection 169 of which is connected through power mains 170 to the armature 160. The motor 165 has a double shaft 166—187, the shaft 166 connecting through a magnetic clutch 171 to a pinion 172 engaging a toothed rack 174 attached to a rod 175 that, in turn, is attached to the tubular member 54 that supports the control plate 52 in the reaction tank 1. We have not shown the cooling conduits for the plate 52 in Fig. 11, this having been discussed in connection with Fig. 1.

The shaft 167 is connected to a pulley 176 having a weight 177 suspended therefrom to substantially balance the weight of the rack 174, rod 175, tubular member 54 and the control plate 52. The function of the magnetic clutch 171 will be described below. In operation the motor 165 controls the position of the control plate 52 with respect to the depth of the slurry in the reaction tank 1.

Having described a circuit for controlling the position of the control plate in the slurry, we will now describe its operation considering the condition obtaining when the reaction tank 1 is filled to an extent such that the operating volume is greater than that corresponding to effective critical size with the control plate dividing the operating volume into two portions, each of which is smaller than critical size so that for this position of the control plate no self-sustaining neutronic reaction occurs. The slider contact 151 on resistor 152 is calibrated in accordance with the neutron activity of the slurry. The slider contact 151 is then set in advance corresponding to the desired maximum neutron density at which the reactor is to operate. While the ionization chamber does not indicate directly the maximum neutron density (i. e., at the center of the body of slurry) within the reactor, the ratio of maximum to measured density (the measured density being that at a point, say, just outside the tank) is a known ratio for all operating neutron densities within the reactor. For a condition where the operating volume in the tank 1 is divided by the control plate into two portions each of which is less than effective critical size, the neutron density is much lower than the desired maximum neutron density and the relay coil 154 will not receive enough current to operate the armature 160 since very little ionization takes place within the ionization chamber 143. Consequently, the armature 160 will rest against the contact 162 driving the motor 142 in a counter-clockwise direction raising the control plate 52 in the slurry. However, as the control plate is raised within the tank 1, the volume below the plate increases and finally exceeds the effective critical volume at which the neutron reproduction ratio is greater than unity. The neutron density will rise until the ionization in the chamber 143 becomes so great that at the maximum desired neutron density the armature 160 is drawn into contact with the motor contact 164 by the relay coil 154. Motor 165 is thus energized to reverse the direction of the pinion and lower the control plate 52. The motor 165 will continue to operate until the control plate is lowered into a position at which the reproduction ratio of the chain reaction is less than unity whereupon the neutron density will commence to fall and eventually due to the lower neutron density and lower ionization in chamber 143, the armature 160 again rests against the contact 162 and the motor 165 is reversed to raise again the control plate 52. The control plate 52 will thereafter hunt between upper and lower limits on either side of a volume below the control plate corresponding to the effective critical size of the reactor. Thus the volume will vary between a point above the balance position at which the neutron density rises exponentially and a point below the balance position where the neutron density decays, providing an average neutron density within the reaction tank as determined by the setting of the sliding contact 151 on the resistor 152. As the mass of the slurry in the reaction tank causes any temperature change to lag behind any neutron density change, the temperature of the slurry is maintained substantially constant. If desired, any of the well-known anti-hunting circuits may be utilized as will be apparent to those skilled in the art.

In the event of power failure which might leave the control plate in a position at which the neutron density would continue to rise above the desired maximum, we provide the magnetic clutch 171 connected across power supply mains 180 in series with manual trip switches 181—182. Any number of such series switches may be used in the circuit. In the event of power failure, or under abnormal operating conditions, the magnetic clutch 171 is deenergized, disconnecting the pinion 172 from the pulley 176 holding the balancing weight 177, allowing the control plate 52 to fall by its own weight until limited by a stop 183. The stop 183 is positioned such that the control plate divides the operating volume into two portions, such as equal portions, neither of which is capable of maintaining a self-sustaining chain reaction.

The control plate 52 may also be operated by hand, as shown in Fig. 12, wherein the rack 174 and pinion 172 are operated directly such as by a crank 183 in response to a visual indicator (not shown) connected with an ionization chamber similar to that described in Fig. 11. As referred to later, the rate of rise of neutron density is a function of the reproduction ratio of the system. For values of this ratio, only slightly exceeding unity, the time required for the neutron density to double over a previously attained density is sufficient to enable use of hand control by raising and lowering the control plate manually.

It should be distinctly understood that the control by movement of the control plate cannot be likened to a throttle control. The rate at which the reaction occurs is not dependent upon the volume of the slurry below the control plate, but rather upon the neutron density attained after exceeding critical size and before decrease to critical size. For example, upon increase of the volume below the control plate beyond effective critical size, the neutron density would continue to increase exponentially with time irrespective of the cooling capabilities of the circulating and heat exchange systems. Control may be effected by maintaining constant the operating volume of slurry while varying the portion thereof above and below effective critical size conditions to maintain a desired neutron density.

Due to the fact that it might be possible for the control circuit as described to fail, and thereby leave the control plate at such a high level that the neutron density would continue to rise indefinitely, we prefer to provide a safety circuit which may be brought into action, either manually in response to dangerous operating conditions, or automatically in response to neutron densities within the system exceeding the predetermined setting of the sliding contact 151 on the resistor 152 whereby the slurry may be dumped from the reaction tank 1.

A circuit for accomplishing dumping is shown in Fig. 11 at B. The pressure release valve 22 is used for this purpose by connecting the release valve rod 190 to a counter-weight 191 urging the release valve to an open position. The release valve 22 is maintained closed by a latch 192 held in engagement with rack 193 on a rod 194 connected to the release valve rod 190 by relay coil 195 which, when energized, holds the lever arm 196 fulcrumed at 197 notwithstanding a weight 199 at the end of the lever arm opposite the relay coil 195. Latch 192 may be withdrawn manually by a handle 200. To maintain the latch 192 in engagement with rack 194 against the weight 199 the relay coil 195 is energized by battery 201 having a circuit completed through series emergency break switches 202 and contact 204 to a movable armature 205. A second ionization chamber 144 similar to that previously described, is provided having the shielded line 147 running through shield 206 connected to the resistor 207 at a sliding contact 209. The resistor is connected across a relay coil 210 returned to the ionization chamber 144 through a battery 211 and the shield 206.

The rod 194 carrying the rack 193 is also attached to the valve rod 212 of the normally open pressure supply valve 21 so that as the release valve 22 is opened the supply valve is closed simultaneously, thereby conserving the helium supply.

In operation of the circuit Fig. 11 at B, the slider contact 209 is adjusted to a position on the resistor 207 corresponding to a maximum safe neutron density slightly above the density setting of resistor 152, circuit A, at which emergency dumping should occur. Under such high neutron density conditions, the magnetic relay 210 attracts armature 205, opening contact 204 allowing weight 199 to fall, withdrawing the latch 192, opening the valve 22 and closing the valve 21.

Since the pressure in the reaction tank 1 maintained by the helium above the operating slurry volume level is somewhat less than the pressure in the slurry reservoir 17, release of the pressure in the slurry reservoir opens the valve 18 allowing the pressure above the reaction tank slurry level to drive the slurry from the reaction tank into the slurry reservoir.

To place the system in operation, it is assumed that the slurry reservoir 17 contains sufficient slurry to fill the reaction tank 1 to an operating volume greater than that corresponding to critical size whereupon the valve 21 is opened and the valve 22 closed allowing helium to enter the slurry reservoir 17 from the helium reservoir 19. The valve 32 is then opened to build up a pressure of helium in the reaction tank 1 somewhat less than that in the reservoir 17. The operating pressure in the reaction tank is preferably sufficient to allow a temperature rise in reaction tank to approximately 120° C. without boiling the heavy water constituent of the slurry. The valve 25 is then opened to allow the slurry to flow under the pressure differential into the reaction tank with the control plate 52 in a position, as previously indicated, such that the volume of the tank is divided into two parts, each of which is less than that corresponding to critical size when the tank is filled to operating volume requirements. The slurry circulating pumps are started, cooling water circulated through the heat exchangers and the control plate raised until the volume below the plate corresponds to effective critical size. The neutronic reaction will then become self-sustaining and may be controlled as previously indicated. The control circuit A is then set for a neutron density corresponding to about a 70° C. temperature rise within the reaction tank or to keep the temperature of the slurry at the intake to the slurry circulation pumps at a safe level. The safety circuit B is also adjusted to shut down the system by dumping the slurry into the slurry reservoir in case of any substantial rise, such as 5% rise over normal neutron density, through failure of the control plate mechanism.

While the pumps and heat exchangers may be located on the outside of the concrete shielding walls, such position would increase the heavy water requirements while still necessitating additional shielding enclosing these portions of the system, because after initiation of the reaction fission products are formed in the slurry that are very radioactive. Thus the fission products created by fission of the $U^{235}$ produce considerable alpha, beta and gamma rays which must be absorbed for the safety of operating personnel. Consequently, and inasmuch as the entire apparatus within the shield comprising the concrete walls and lead lining of the tank becomes radioactive, it is impractical following initiation of the reaction and maintenance of high neutron density within the reaction tank to service or otherwise adjust or rebuild the moving parts within the shield. For example, in the structure shown in Figs. 7 and 8, it would be impractical to repair or replace the pumps 4 although servicing of the driving mechanism for these pumps is facilitated by placing the driving motors exteriorly of the concrete shield.

In view of the present cost of heavy water moderator, it is desirable to reduce the amount used to a minimum. This may be accomplished by reducing the amount outside the reactor and by utilizing an optimum concentration of uranium-containing material. We have shown the heat exchangers as being as close to the reactor as feasible to thereby minimize the length of piping carrying the heavy water slurry. For a given number of heat exchangers more heat may be removed from the reactor by using a higher temperature of the circulating slurry, although increase in temperature decreases the reproduction factor somewhat. The gain in increased heat transfer, however, more than compensates the necessary slight increase in slurry volume for a given reproduction factor until boiling of the heavy water occurs. It is thus economically desirable with respect to heavy water utilization, to operate at a temperature below boiling. The utilization may be increased still further by operating the system at a maximum slurry temperature normally above the boiling point, preventing boiling by an increase in pressure. Thus a pressure greater than that corresponding to a maximum slurry temperature of 120° C. is preferred notwithstanding the necessity for providing a system capable of withstanding the increased pressure. Consequently, we prefer to provide the reaction tank 1 of such construction to withstand an internal pressure of from 100 to 150 pounds per square inch, the slurry reservoir connecting piping and heat exchangers being designed to withstand a similar pressure.

While we have shown a system incorporating two heat exchangers surrounding the reactor, a different number may be used depending upon the maximum or minimum rate of heat dissipation desired. Preferably, a greater number of heat exchangers and associated pumps than the desired minimum capacity is installed inasmuch as pump or exchanger failure necessitates their removal from the system by closing their associated valves. Thus, following initiation of the neutronic reaction radioactive fission fragments will become lodged in the pumps rendering them exceedingly radioactive. Repair or replacement is impractical and the number initially installed must be sufficient to allow for standby in case of failure or for operation at reduced operating levels with failure of one or more of the circulating systems.

Other measures may be used to assure complete safety in the operation of the system. Remote recording thermometers should be provided in the inlet 6 and outlet 7 cooling water lines of the heat exchangers 5, as well as remote recording flow meters, to determine cooling water flow both in the heat exchanger systems as well as in the water supply line 102 filling the tank 100 in which the reaction tank 1 is immersed. These, as well as other controls, are dictated by conventional engineering practice and need not be considered in detail except to point out that safety controls operated, for example, by excessive temperature rises or insufficient cooling water flow may be utilized to stop the neutronic reaction either by dropping the control plate or by dumping the slurry into the slurry reservoir.

Having described our invention with specific reference to a reactor wherein the reaction occurs in a slurry of uranous material in a heavy water moderator, it will be apparent that the objects of our invention will be fulfilled when using a lattice structure wherein the uranous material is aggregated and distributed as massive bodies throughout the moderator.

The reactor lattice may comprise vertical uranium rods covered with thin coatings of aluminum or other material having low neutron capture cross-section supported vertically in a tank containing the heavy water moderator and wherein the control plate is immersed in the heavy water moderator with the coated uranium tubes extending through the control plate. The control plate is made movable vertically and effectively divides the moderator into an upper inactive portion and a lower active portion. While we have not shown such a system in the drawings, our invention is equally applicable to such a system wherein the uranium and the surrounding heavy water above the reaction plate is inadequate to support or materially supply neutrons to the chain reaction, whereas the controlled reaction is effected in the lower portion of the reaction tank. The heavy water moderator in such a system may be circulated, as in the case of the previously described slurry, through heat exchangers for cooling purposes, or the rods may be coated and be contained within aluminum tubes for supplementary cooling. A typical reactor system of this type is described in the aforementioned Fermi-Szilard application.

Such a reactor lattice system may comprise approximately 136 rods of metallic uranium 1.1 inches in diameter extending downwardly in a tank 6 feet in diameter and 7 feet 4 inches high to a point about ¼ inch from the bottom of the tank. The rods are coated with aluminum 0.035 inch thick. The uranium rods are supported vertically in deuterium oxide approximately 124.7 centimeters deep and distributed throughout the heavy water as a square lattice configuration with 4 inch center to center spacing. A control plate suitable for use in such a reactor is preferably apertured with similar 4 inch center to center openings through which the aluminum tubes extend, and is movable along the tubes to determine the volume of heavy water effective as the moderator. The various features incorporated in the previously described slurry reactor system may be applied to the lattice system with equal facility.

An important element in the control of the reactor is the fact that not all of the fast neutrons originating in the fission process are emitted immediately. About one percent of the fast neutrons are "delayed neutrons." These delayed fast neutrons may appear at any time up to several minutes after the fission has occurred. Half of these neutrons are emitted within 6 seconds and .9 within 45 seconds. The mean time of delayed emission is about 5 seconds. The cycle of neutron emission, migration through the moderator slowing to thermal energy and fission capture is completed by 99% of the neutrons in about .0015 second, but if the reactor is near the balanced condition the extra 1% may make all the difference between an increase or a decrease in the neutronic activity. The fact that the last neutron in the cycle is held back, as it were, imparts a slowness of response to the reactor that would not be present if the neutrons were all emitted instantaneously.

For cases in which the reproduction ratio ($r$) differs from unity by less than 1%, the ratio of rise is given by $$n = n_0 e^{wt}$$

where $$w = \frac{r-1}{\alpha - (r-1)} \cdot \frac{1}{T}$$

In this formula, $\alpha$ is the fraction of the neutrons that are delayed, $\alpha = .01$, $T$ is the mean time of delayed emission of the delayed neutrons $= 5$ seconds.

As an example, assume $r$ becomes 1.001 as a result of increasing the active volume of the slurry or the moderator by raising the control plate. Then $$w = \frac{.001}{.01 - .001} \cdot \frac{1}{5} = \frac{1}{45}$$

that is, $n/n_0 = 2.72$ in 45 seconds. Hence doubling of the neutron density occurs about every 30 seconds and continues indefinitely.

If $r$ were made exactly 1.01, a more detailed theory shows that the neutron density would be tripled each second. However, if the reproduction ratio $r$ is suddenly increased several percent, so that the one percent delayed neutrons are unimportant compared with $r-1$, the neutron density increases at a much more rapid rate as given approximately by $r^t/l$ where $l$ is .0015 second, the normal time to complete a cycle. Thus, if $r$ were to be made 1.04, the neutron density would increase in 1.5 seconds by a factor of approximately $10^{17}$ over its original level. However, if $r$ were 1.02 or 1.03, the factor by which the neutron density would be multiplied each second would be 1100 and 700,000, respectively. It is thus apparent that too high a reproduction ratio in a practical system leads to the necessity of providing safety measures which positively limit all danger of exceeding a permissible rate of neutron density increase. An exceedingly dangerous condition could exist if by accident, the active volume of slurry or moderator in the reactor was suddenly increased considerably beyond the critical size as the time required for lowering the control plate might be too long to prevent destruction of the system. As the same eventual neutron density can be obtained with a reproduction ratio only slightly over unity as with a higher ratio, only at a slower rate, the lower reproduction ratios are preferred in practice in the interest of safety.

In addition to the usual industrial hazards during the operation of the reactor, operating personnel must be protected from injury by gamma rays and neutrons generated in the reactor as well as from radiation from the cooling water surrounding the reactor, from beta rays, from close contact with radioactive materials, and from radioactive poisoning due to inhalation of radioactive gases. The major portion of the radiation emitted from the reactor is intercepted by the water surrounding the reactor and by the concrete shield. The depth, or rather thickness, of the water surrounding the reactor is determined by the slowing action and capture of the neutrons by the water. Since, especially in the slurry system, the heat exchangers contain the radioactive fission products and are nearer the water shield tank, beta rays therefrom must be considered in determining the shielding thickness. The minimum depth of water between the heat exchangers and the tank in which the exchangers are immersed is 3 feet and the minimum depth from the reactor thereto is 8 feet while the thickness of the concrete shield is preferably no less than 10 feet. Inasmuch as the concrete contains water of crystallization and may contain water retaining materials, and is relatively dense, it serves as an effective shield for neutrons as well as gamma rays. In addition to these precautions, we prefer to provide the lead shield lining the immersion tank of a thickness of 6 inches, lead being very effective as a gamma ray shield. Such precautions will reduce the radiation from the structure to 0.10 roentgen per 8 hour day per person at the point of closest approach, this exposure being considered to be the maximum safe radiation permissible to which an individual may be subjected over the whole body.

The present invention is generally applicable to use with neutronic reactors. While the illustrations herein described have been particularly concerned with reactors in which solid fissionable bodies are distributed in a liquid moderator, it is not limited to such reactors. For example, true solutions of uranium compounds such as ammonium, uranyl carbonate, uranyl fluoride or uranyl nitrate particularly enriched compounds wherein 10–20 percent or more of the uranium is $U^{235}$ or $U^{233}$ may be used for this purpose. Where natural uranium is used, deuterium oxide is found to be a suitable solvent. With soluble uranium containing greater than natural concentration of fissionable isotope a wider range of solvents is permissible and if the enrichment is sufficiently high (for example, 10 percent or more of the uranium) ordinary water may be used. Other solvents include deuterobenzene or other deuterocarbons. Likewise, other fissionable compositions such as mixtures of $94^{239}$ and $U^{238}$ or $Th^{232}$ and $94^{239}$, $U^{233}$ or $U^{235}$ may be used.

The method of control herein described may be used as the sole means of control of a reactor if desired. However, other controls such as retractable neutron absorbing rods or other convenient control including those described in the above mentioned Fermi-Szilard application may be used in conjunction with the presently described controls.

The system as described has many uses. Radioactive fission products and new elements both radioactive and stable are produced. If desired, the fission products, radioactive and stable, and the $94^{239}$ produced through beta decay of $93^{239}$ by normal operation of the reactor can be recovered after a predetermined exposure of the uranium to high neutron densities by removing the uranium and extracting the desired elements as referred to above. The radioactive fission products are valuable as gamma radiation sources and for use as biological tracers in medicine, while $94^{239}$ is useful as a fissionable material to increase K factors when added to natural uranium, or when used alone, in neutronic reaction systems.

While the theory of the nuclear fission reaction in uranium set forth herein is based on the best presently known experimental evidence, we do not wish to be bound thereby, as additional experimental data later discovered may modify the theory disclosed. Any such modification of theory, however, will in no way affect the results to be obtained in the practice of the invention herein described and claimed.

What is claimed is:

1. A self-sustaining neutronic reacting system comprising a tank containing a composition which comprises natural uranium dispersed in heavy water, the total volume thereof and the concentration of the composition therein being sufficient to provide a divergent neutronic chain reaction, and a partition for separating said volume into two portions including a cadmium plate, one of said portions being greater than critical size and the other of said portions being smaller than critical size, whereby a nuclear chain reaction can develop only in the larger of said portions.

2. A device for developing a reaction by nuclear fission comprising a reaction tank containing a material fissionable by thermal neutrons disposed in a mass of heavy water and in amount sufficient to provide an exponentially rising neutron density chain reaction, a plate of neutron absorbing material extending across said tank generally parallel to the level of the liquid heavy water and below the level of the heavy water therein, said neutron absorbing plate being completely immersed in said heavy water, and means to move said plate to vary its depth in said mass of heavy water.

3. A device for producing a self-sustaining neutronic reaction comprising a tank containing a slurry of particles containing material fissionable by thermal neutrons in a liquid moderator, the density of said slurry being sufficient to provide a reproduction factor which is greater than unity, the total volume of said slurry being sufficient to provide a reproduction ratio greater than unity, a neutron absorbing plate extending substantially parallel to one surface of and substantially completely immersed in said slurry, and means to vary the depth of immersion of said plate in said slurry to develop and control a neutronic reaction.

4. A device for developing a neutronic reaction comprising a container containing a quantity of heavy water, a material fissionable by thermal neutrons suspended in said heavy water and being distributed throughout said heavy water, said heavy water and said fissionable material being insufficient to fill said container but greater than that necessary to maintain a self-sustaining reaction, and a neutron absorbing control plate extending across said container below the surface of said heavy water to divide the contents of said container into two portions, said neutron absorbing plate being disposed generally parallel to the surface of the heavy water and substantially immersed within said quantity of heavy water.

5. A method of terminating a neutronic reaction in a liquid dispersion of material fissionable by thermal neutrons in heavy water in a reaction tank comprising the step of dropping a plate of neutron absorbing material having an extended surface substantially dividing said reaction tank into two separate but intercommunicating reaction chambers from one level to a lower level in said slurry while maintaining the total absorption of slow neutrons in said slurry substantially constant.

6. The method of initiating a neutronic reaction in a neutronic reactor comprising two adjacent intercommunicating portions, each portion containing less than a critical mass of a slurry of a liquid moderator and material fissionable by thermal neutrons, and separated by a neutron absorbent barrier extending across the interface between the adjacent portions, which comprises increasing the mass of one portion with respect to the other while proportionately decreasing the other mass until at least a critical mass is attained in the larger portion whereby a neutronic reaction is initiated.

7. A neutronic reactor comprising a tank, means dividing said tank into two adjacent compartments including a neutron absorbing member disposed at the interface between the two compartments, a mass of heavy water disposed within both of the compartments, a mass of uranium suspended uniformly within the mass of heavy water in sufficient concentration to support a neutron chain reaction, and means to vary the relative sizes of the two compartments within the tank, the total volume of the two compartments together being less than twice the critical size of a reactor containing heavy water and uranium in the concentration disposed within the tank.

8. A neutronic reactor comprising a tank, a mass of liquid moderating material disposed within the tank, a mass of material fissionable by neutrons of thermal energy distributed uniformly throughout the liquid moderating material, a neutron barrier extending across the tank and dividing the tank into two adjacent portions, said barrier substantially preventing neutrons in one portion of the tank from entering the other portion of the tank, and means to vary the relative sizes of the two portions of the tank.

9. A neutronic reactor comprising a tank, a slurry disposed within the tank having a mass of liquid moderator and a quantity of material fissionable by thermal neutrons distributed within the mass of neutron moderator, said quantity being greater than that required to maintain a self-sustaining neutronic chain reaction, and means containing nonfissionable thermal neutron absorbing material extending in a plane across the tank for neutronically partitioning the mass of liquid moderator material and fissionable material into two unequal portions, one of said portions being of sufficient volume to initiate a neutronic chain reaction and the other of said portions being of insufficient volume to initiate a neutronic chain reaction.

References Cited in the file of this patent

UNITED STATES PATENTS

| | | |
|---|---|---|
| 2,708,656 | Fermi et al. | May 17, 1955 |

FOREIGN PATENTS

| | | |
|---|---|---|
| 114,150 | Australia | May 2, 1940 |
| 114,151 | Australia | May 3, 1940 |
| 861,390 | France | Oct. 28, 1940 |
| 233,011 | Switzerland | Oct. 2, 1944 |

OTHER REFERENCES

Smyth: "Atomic Energy for Military Purposes," pp. 177–180, August 1945. (Copy may be purchased from Supt. of Doc., Washington 25, D. C.)

Kelly et al.: Phy. Rev., 73, 1135–9 (1948) (204/154.2). (Copy in Lib.)

Ser. No. 283,312, Berghans et al. (A. P. C.), published May 18, 1943.